(12) United States Patent
Eberwein (10) Patent No.: US 8,016,467 B2
(45) Date of Patent: Sep. 13, 2011

(54) LICENSE PLATE ASSEMBLY

(75) Inventor: Arnold Eberwein, Meerbusch (DE)

(73) Assignee: 3M Innovative Properties Company, St. Paul, MN (US)

( * ) Notice: Subject to any disclaimer, the term of this patent is extended or adjusted under 35 U.S.C. 154(b) by 195 days.

(21) Appl. No.: 12/278,082

(22) PCT Filed: Jan. 23, 2007

(86) PCT No.: PCT/US2007/001713
§ 371 (c)(1),
(2), (4) Date: Jan. 2, 2009

(87) PCT Pub. No.: WO2007/092152
PCT Pub. Date: Aug. 16, 2007

(65) Prior Publication Data
US 2009/0141512 A1 Jun. 4, 2009

(30) Foreign Application Priority Data
Feb. 2, 2006 (GB) .................................. 0602105.9

(51) Int. Cl.
*B60Q 1/56* (2006.01)
(52) U.S. Cl. .......... 362/497; 362/612; 362/613; 40/204; 40/205; 40/206
(58) Field of Classification Search .................. 362/497, 362/612, 613, 555, 561, 235; 40/204–206, 40/546
See application file for complete search history.

(56) References Cited

U.S. PATENT DOCUMENTS

| | | | |
|---|---|---|---|
| 1,122,279 A | 12/1914 | Juan |
| 1,155,279 A | 9/1915 | Rymer |
| 1,705,030 A | 3/1929 | Sacerdote |
| 3,241,256 A | 3/1966 | Viret et al. |
| 3,510,976 A | 5/1970 | Pauline et al. |
| 3,700,305 A | 10/1972 | Bingham |
| 3,712,706 A | 1/1973 | Stamm |
| 3,802,102 A | 4/1974 | Licciardi |

(Continued)

FOREIGN PATENT DOCUMENTS
DE    3910071    10/1990
(Continued)

OTHER PUBLICATIONS
3M's Dec. 19, 2008 Reply to the Opposition of 3M's European Patent No. 1477368 (including First and Second Auxiliary Requests) corresponding to U.S. Appl. No. 10/556,212.

(Continued)

*Primary Examiner* — Evan Dzierzynski
(74) *Attorney, Agent, or Firm* — Sandra K. Nowak (57) ABSTRACT

The present invention provides a license plate assembly comprising: (i) a housing comprising a back plate and upstanding side walls defining a cavity; (ii) a light guide having first and second major sides that are opposite to each other and one or more side faces defining a thickness of side light guide, said light guide being disposed in said housing and being arranged on said back plate of said housing; (iii) a light source mounted along one or more side faces of said light guide; (iv) a transparent and retroreflective license plate mounted on said first major side of said light guide; and wherein a cushioning layer is provided between said back plate of said housing and said light guide.

12 Claims, 3 Drawing Sheets

U.S. PATENT DOCUMENTS

| | | | |
|---|---|---|---|
| 4,005,538 | A | 2/1977 | Tung |
| 4,025,159 | A | 5/1977 | McGrath |
| 4,181,752 | A | 1/1980 | Martens et al. |
| 4,256,828 | A | 3/1981 | Smith |
| 4,418,120 | A | 11/1983 | Kealy et al. |
| 4,475,298 | A | 10/1984 | Munoz |
| 4,511,210 | A | 4/1985 | Tung et al. |
| 4,588,258 | A | 5/1986 | Hoopman |
| 4,622,349 | A | 11/1986 | Koleske et al. |
| 4,631,229 | A | 12/1986 | Martens et al. |
| 4,688,894 | A | 8/1987 | Hockert |
| 4,763,985 | A | 8/1988 | Bingham |
| 4,768,300 | A | 9/1988 | Rutili |
| 4,775,219 | A | 10/1988 | Appeldorn et al. |
| 4,812,488 | A | 3/1989 | Koleske et al. |
| 4,889,895 | A | 12/1989 | Chernega et al. |
| 4,895,428 | A | 1/1990 | Nelson et al. |
| 4,920,182 | A | 4/1990 | Manser et al. |
| 4,983,436 | A | 1/1991 | Bailey et al. |
| 5,064,272 | A | 11/1991 | Bailey et al. |
| 5,066,098 | A | 11/1991 | Kult et al. |
| 5,069,964 | A | 12/1991 | Tolliver et al. |
| 5,086,088 | A | 2/1992 | Kitano et al. |
| 5,122,902 | A | 6/1992 | Benson |
| 5,138,488 | A | 8/1992 | Szczech |
| 5,153,760 | A | 10/1992 | Ahmed |
| 5,182,663 | A | 1/1993 | Jones |
| 5,228,223 | A | 7/1993 | Lan |
| 5,262,225 | A | 11/1993 | Wilson et al. |
| 5,262,928 | A | 11/1993 | Kashima et al. |
| 5,289,351 | A | 2/1994 | Kashima et al. |
| 5,363,294 | A | 11/1994 | Yamamoto et al. |
| 5,375,043 | A | 12/1994 | Tokunaga |
| 5,377,084 | A | 12/1994 | Kojima et al. |
| 5,387,458 | A | 2/1995 | Pavelka et al. |
| 5,394,308 | A | 2/1995 | Watanabe et al. |
| 5,450,235 | A | 9/1995 | Smith et al. |
| 5,452,532 | A | 9/1995 | Nishio |
| 5,600,462 | A | 2/1997 | Suzuki et al. |
| 5,605,761 | A | 2/1997 | Burns et al. |
| 5,614,286 | A | 3/1997 | Bacon, Jr. et al. |
| 5,618,096 | A | 4/1997 | Parker et al. |
| 5,633,623 | A | 5/1997 | Campman |
| 5,649,754 | A | 7/1997 | Matsumoto |
| 5,667,289 | A | 9/1997 | Akahane et al. |
| 5,691,846 | A | 11/1997 | Benson, Jr. et al. |
| 5,692,327 | A | 12/1997 | Wynne et al. |
| 5,736,686 | A | 4/1998 | Perret, Jr. et al. |
| 5,816,681 | A | 10/1998 | Tedesco |
| 5,959,775 | A | 9/1999 | Joseph et al. |
| 6,004,422 | A * | 12/1999 | Janovec et al. ............... 156/276 |
| 6,029,382 | A | 2/2000 | Kochanowski |
| 6,036,328 | A | 3/2000 | Ohtsuki et al. |
| 6,149,204 | A | 11/2000 | Casper |
| 6,166,856 | A | 12/2000 | Araki et al. |
| 6,172,810 | B1 | 1/2001 | Fleming et al. |
| 6,224,219 | B1 | 5/2001 | Fleming et al. |
| 6,243,201 | B1 | 6/2001 | Fleming et al. |
| 6,282,026 | B1 | 8/2001 | Dreyer et al. |
| 6,350,034 | B1 | 2/2002 | Fleming et al. |
| 6,350,035 | B1 | 2/2002 | Smith et al. |
| 6,372,341 | B1 | 4/2002 | Jung et al. |
| 6,501,218 | B1 | 12/2002 | Duggal et al. |
| 6,608,333 | B1 | 8/2003 | Lee et al. |
| 6,652,954 | B2 | 11/2003 | Nielsen et al. |
| 6,698,118 | B2 | 3/2004 | Tietze et al. |
| 6,874,922 | B2 | 4/2005 | Matsuura et al. |
| 7,068,434 | B2 | 6/2006 | Florczak et al. |
| 2001/0021110 | A1 | 9/2001 | Nakayama et al. |
| 2002/0178627 | A1* | 12/2002 | Tietze et al. .................... 40/205 |
| 2003/0051380 | A1 | 3/2003 | Butler et al. |
| 2003/0090797 | A1 | 5/2003 | Mueller |
| 2003/0192212 | A1 | 10/2003 | Hsu |
| 2004/0139636 | A1 | 7/2004 | Lin |
| 2004/0165402 | A1* | 8/2004 | Chen ............................ 362/559 |
| 2005/0024858 | A1 | 2/2005 | Johnson |
| 2005/0078487 | A1 | 4/2005 | Tietze et al. |
| 2005/0120605 | A1 | 6/2005 | Fitzke et al. |
| 2005/0150146 | A1 | 7/2005 | Moser et al. |
| 2006/0242867 | A1 | 11/2006 | Choi |
| 2007/0006493 | A1 | 1/2007 | Eberwein |
| 2007/0209244 | A1 | 9/2007 | Prollius et al. |

FOREIGN PATENT DOCUMENTS

| | | |
|---|---|---|
| DE | 38 25 436 C2 | 4/1991 |
| DE | 04126530 | 2/1993 |
| DE | 295 08 596 | 9/1995 |
| DE | 297 12 954 | 10/1997 |
| DE | 20022563 | 12/2001 |
| DE | 101 32 998 A1 | 9/2002 |
| DE | 20215988 U1 | 12/2002 |
| DE | 20218626 | 3/2003 |
| DE | 10160376 | 6/2003 |
| DE | 10247708 | 8/2003 |
| DE | 20316349 | 2/2004 |
| DE | 10 2004 025325 | 8/2005 |
| DE | 69831331 | 6/2006 |
| EP | 0276716 | 8/1988 |
| EP | 0360420 | 3/1990 |
| EP | 0 534 140 B1 | 3/1993 |
| EP | 0620 259 | 10/1994 |
| EP | 0 878 720 B1 | 11/1998 |
| EP | 0986042 | 3/2000 |
| EP | 1 026 218 | 8/2000 |
| EP | 1 245 656 | 10/2002 |
| EP | 1 262 373 | 12/2002 |
| EP | 1 318 181 | 6/2003 |
| EP | 1 477 368 | 11/2004 |
| EP | 1 496 489 A1 | 1/2005 |
| EP | 1 512 583 | 3/2005 |
| FR | 2744519 | 8/1997 |
| FR | 2818787 | 6/2002 |
| GB | 2255312 | 4/1992 |
| JP | 58-211441 A | 12/1983 |
| JP | 06-347622 | 12/1994 |
| JP | 10119669 | 5/1998 |
| JP | 2002-139729 A | 5/2002 |
| WO | WO 92/05535 | 4/1992 |
| WO | WO 92/13331 | 8/1992 |
| WO | WO 95/13331 | 5/1995 |
| WO | WO 95/31739 | 11/1995 |
| WO | WO 98/20375 | 5/1998 |
| WO | WO 01/71248 | 9/2001 |
| WO | WO 2004/048155 | 6/2004 |
| WO | WO2005102783 * | 3/2005 |

OTHER PUBLICATIONS

DIN 74069 Ausgabe Juli 1996.

Handbook of Pressure Sensitive Adhesive Technology (third edition) D.Satas, Ed. Satas and Associates, Warwick RI/USA, 1989 on pp. 444-514, 550-556 and 423-442.

Online-magazine Schott Info 99/2001.

Briefing submitted to the European Patent Office by J.H. Tonnjes GmbH & Co. KG regarding their opposition of 3M's European Patent No. 1477388 related to the present patent application.

Briefing submitted to the European Patent Office by J.H. Tonnjes GmbH & Co. KG regarding their opposition of 3M's European Patent No. 1512583 related to the present patent application.

Appeal letter submitted to the European Patent Office by J.H. Tonnjes GmbH & Co. KG regarding their opposition of 3M's European Patent No. 1512583 related to the present patent application.

* cited by examiner

LICENSE PLATE ASSEMBLY

CROSS REFERENCE TO RELATED APPLICATIONS

This application is a national stage filing under 35 U.S.C. 371 of PCT/US2007/001713, filed Jan. 23, 2007, which claims priority to Great Britain Application No. 0602105.9, filed Feb. 2, 2006.

BACKGROUND

The present invention relates to a license plate assembly comprising a housing having a back plate on which there is arranged a light guide and a semi-transparent and reflective license plate. The light guide is illuminated from one or more of its side faces and the light guide. The license plate is mounted in front of the light guide, typically by means of a frame.

Commonly employed license plates for motor vehicles for use on roads such as cars, busses and trucks and for trailers, typically are illuminated from their front face when it is dark. In particular, the license plates typically have indicia representing the license plate number issued by the appropriate national authorities on a retroreflective background. This retroreflectivity enhances visibility of the plate during day time conditions and also during night time conditions when lights of other motor vehicles or street light impinges upon the front face of the license plate. But in order to meet regulatory requirements, the license plate also needs to be illuminated with lights arranged on the motor vehicles. Thus, typically, lights are arranged aside of the license plate so as to illuminate the front face of the license plate.

Such an arrangement has the disadvantage of limiting the design possibilities of car manufacturers. In particular, the lights that need to be arranged along one or more sides of the license plate prevent the car manufacturer of making more appealing designs as the lights often appear as a disturbing element in the design. Furthermore, such front-lit license plates may suffer from a non-uniform illumination of the license plate. Typically also more powerful light sources may be required to light a license plate from the front, thus resulting in more power consumption.

DE 297 12 954 discloses a license plate arrangement that is illuminated from the back. In particular, this German utility model discloses a stiff transparent plastic plate on which the license plate number is depicted as opaque indicia. The stiff plastic plate is held in front of an electroluminescent foil through a holding frame. The electroluminescent foil when activated illuminates the plastic plate from the back. Such an arrangement has the disadvantage that no retroreflectivity is provided which is a requirement of the regulatory authorities of many countries. A further back-lit license plate is disclosed in U.S. Pat. No. 5,692,327.

EP 1 262 373 describes a back-lit electroluminescent license plate arrangement that also provides retroreflectivity. A further back-lit electroluminescent license plate is disclosed in WO 04/048155.

EP 1 477 368 discloses an illuminated license plate for vehicles, comprising a light guide having opposite major front and back faces and side faces there between, an elongate light source arranged along at least a portion of at least one of the side faces of the light guide for illuminating the light guide, a light-transmissive retro-reflective film, and indicia, wherein the light-transmissive retro-reflective film and indicia are arranged in front of the front face of the light guide.

According to a particular embodiment, it is disclosed that the illuminated license plate is encapsulated by a frame and held against a back plate.

It has now been found that in an arrangement as disclosed above where the light guide is held in a housing against a back plate, damage may occur to the light guide and/or light sources, for example LEDs that are arranged on the side faces of the light guide to illuminate the latter. In particular, it was found that this damage may occur over time when the license plate is in use on a car as a result of vibrations occurring in the license plate assembly. It was found that these vibrations occur as a result of manufacturing tolerance of the light guide that need to be accommodated when assembling the license plate and light guide in a housing.

It would now be desirable to overcome one or more of the aforementioned disadvantages.

SUMMARY

In accordance with one aspect a license plate assembly is desired comprising:
(i) a housing comprising a back plate and upstanding side walls defining a cavity;
(ii) a light guide having first and second major sides that are opposite to each other and one or more side faces defining a thickness of side light guide, said light guide disposed in said housing and being arranged on said back plate of said housing;
(iii) a light source arranged along one or more side faces of said light guide;
(iv) a transparent and retroreflective license plate mounted on said first major side of said light guide;
and wherein a cushioning layer is provided between said back plate of said housing and said light guide.

DETAILED DESCRIPTION OF THE PREFERRED EMBODIMENTS

The term 'transparent' means transparency for visible light and includes both clear transparency as well as translucency. Generally, a material is considered transparent if at least 20%, generally at least 30%, for example at least 50%, at least 60% or at least 80% of visible light illuminating the material can pass through the material.

The term 'opaque' in connection with the invention is intended to mean that visible light is substantially absorbed or reflected, i.e. at least 90% of the light is absorbed or reflected, typically at least 95% of the visible light is absorbed or reflected.

The term 'retroreflective' is used to indicate that the relevant article reflects light in substantially the same direction from which it originated.

It has been found that the use of a cushioning layer between the back plate of the housing and the light guide can accommodate the manufacturing tolerances of the light guide and can prevent or minimize vibrations in the license plate assembly and thereby minimize potential damage to the light source and/or light guide.

The cushioning layer for use in accordance with the invention is typically a layer that is generally capable of conforming to the back plate of the license plate assembly and is generally further capable of distributing pressure and stress when the light guide is pressed against the cushioning layer and back plate of the housing. Generally, the cushioning layer is a resilient layer and/or provides vibration damping in the license plate assembly. Typically, the cushioning layer will have a thickness between 4 and 12 mm, for example between 2 and 8 mm (measured without compressing the cushioning layer).

In a particular embodiment, the major side of the cushioning layer facing the light guide in the license plate assembly is (diffuse) reflective. This may for example be achieved by painting the cushioning layer or by providing a reflective layer on said major side of the cushioning layer. Preferably, the cushioning layer itself has a reflective surface. In a particular embodiment, the cushioning layer has a white or substantially white surface or is provided with a white layer on the major side facing the light guide.

In accordance with one embodiment, the cushioning layer is selected from woven webs, non-woven webs, rubbers or elastomeric materials including for example gels, and foams including polymeric foams. For reasons of costs and convenience, a non-woven fibrous web is typically preferred. Examples of non-woven fibrous webs that may be used include THINSULATE webs, commercially available from 3M Company. Typically, the preferred non-woven webs will be reflective, i.e. are white or substantially white.

License Plate

The license plate of the license plate assembly is a transparent and retroreflective license plate. The license plate typically will have shape and dimensions conforming to relevant regulatory requirements. Also, the license plate will comprise indicia that represent the number of the license plate as may be issued by a relevant authority. In addition to indicia representing the number of the license plate, the license plate may comprise further indicia such as for example indicia showing the country letter or indicia giving indications of the manufacturer of the license plate and/or date of issuance of the license plate. Some of these latter indicia may be in machine readable form such as for example in the form of a bar code. The indicia of the license plate can be formed by any technique used in producing license plates. For example, the indicia, in particular those representing the number of the license plate, may be printed e.g. by thermal transfer printing or by ink jet printing or the indicia may be cut out of a colored adhesive film and glued on the plate. The indicia may be printed on or glued on the front face of the license plate or they can be buried in the license plate laminate. In addition to printed indicia, the indicia may be raised. By raised indicia is meant that the indicia project from the front face of the license plate. Typically the indicia can be raised by 0.3 to 20 mm relative to the background of the license plate, preferably 0.5 to 15 mm. Raised indicia may be obtained by deep drawing but are preferably made by embossing a laminate of the transparent polymeric support sheet and the retroreflective sheet. Preferably the raised surface of the indicia will be colored to render the indicia opaque or at least less transparent than the background of the license plate. Typically the raised surface may be colored by hot foil stamping or by roll coating with inks.

The license plate includes a transparent retroreflective sheet or film. The transparent retroreflective sheet for use in connection with the present invention can be a single layer sheet but is generally a multi-layer sheet. The retroreflective sheet may be a microsphere based retroreflective sheet or a so-called cube corner based retroreflective sheet. Microsphere-based sheeting, sometimes referred to as "beaded sheeting," is well known in the art and includes a multitude of transparent microspheres, e.g. glass or ceramic microspheres, typically at least partially embedded in a binder layer, and associated specular or diffuse reflecting materials. The reflective material should be provided functionally behind the microspheres. By 'functionally behind' is meant that the reflective layer is provided behind the microspheres in such a way that in conjunction with the microspheres light will be retroreflected. Typically, this means that the reflective layer is directly provided on the microspheres or is slightly spaced away, through a space coat, from the microspheres to adjust to the focal point of the microspheres. Illustrative examples of microsphere-based sheeting are disclosed in U.S. Pat. Nos. 4,025,159 (McGrath); 4,983,436 (Bailey); 5,064,272 (Bailey); 5,066,098 (Kult); 5,069,964 (Tolliver); and 5,262,225 (Wilson). The reflective material in one embodiment of this invention can be a reflective metal layer. When the reflective layer is a reflective metal layer, it should be provided at such a thickness that enough reflection can occur and at the same time sufficient transparency is obtained as well. Alternatively, the reflective layer may comprise a two-dimensional pattern of metal areas of contiguous metal and open areas having substantially no metal. By two-dimensional is meant that the metal areas and open areas interchange with each other along the width and length of the retro-reflective layer. The pattern may be regular as well as irregular. Hence a semi-transparent retroreflective material may be provided in that it is comprised of transparent and opaque areas.

Thus, in this embodiment, the semi-transparent retroreflective material has a retroreflective side and an opposite rear side, the retroreflective material having a regular or irregular two-dimensional pattern of transparent and opaque areas, the retroreflective material comprising a layer of transparent microspheres and a reflective layer located functionally behind the layer of transparent microspheres, the reflective layer comprising a regular or irregular two-dimensional pattern of metal areas of contiguous metal and open areas having substantially no metal, wherein open areas of the reflective layer correspond to transparent areas of said retroreflective material and metal areas of the reflective layer correspond to opaque areas of the retroreflective material and wherein the transparent microspheres are present in the transparent and opaque areas and wherein the transparent areas comprise at least 5% of the total surface of the retroreflective material on the retroreflective side.

The pattern of metal and open areas may be provided as individual discrete metal areas between which are defined the open areas, i.e. the open areas are connected with each other and define a continuous open area between the individual metal areas. Alternatively, the inverted pattern may be provided where discrete open areas between which are defined metal areas that are connected with each other so as to define a continuous metal area between the open areas. In a further embodiment, the pattern may be comprised of several individual metal areas and several individual open areas that may not be connected so as to define a continuous area of open areas or metal areas. An example of such a pattern may be a checker board.

The shape and size of individual open areas and/or metal areas is not particularly critical and may vary over a wide range. For example the metal and/or open areas may be rectangular, square, circular or elliptical in shape or they may have an irregular shape or polygonal shape. Individual discrete open areas or individual discrete metal areas may have a size of between 0.01 mm$^2$ and 20 mm$^2$, typically from about 0.05 mm$^2$ to 15 mm$^2$ such as for example between 1 mm$^2$ and 7 mm$^2$. In a particular embodiment in connection with the present invention, part of the open and/or metal areas are of a similar shape and/or size. So for example, in accordance with a particular embodiment the individual open areas may substantially all be of the same size and/or shape. In another embodiment, the metal areas are of the same size and shape. In yet a further embodiment individual open areas and metal areas are of the same shape, e.g. rectangular.

The metal areas in the semi-transparent retroreflective material contain a contiguous metal, i.e. the metal areas are typically comprised of vapour deposited metal. A variety of metals may be used to provide the metal areas of the reflective layer. These include aluminium, silver, chromium, nickel, magnesium, gold, and alloys thereof, in elemental form.

Aluminium and silver are the preferred metals for use in the reflective layer. The metal areas should typically be thick enough to render the retroreflective material opaque in areas where the reflective layer contains metal areas.

The open areas of the reflective layer of the semi-transparent retroreflective material generally do not contain metal or only a slight amount, typically such that the open areas provide transparent areas in the reflective layer. The open areas of the reflective layer are typically filled with polymeric material of the binder matrix or with material of another layer contained in the retroreflective material.

The metal areas of the reflective layer of the semi-transparent retroreflective material are typically obtained by vapour depositing the metal. In order to achieve a desired pattern of open and metal areas in the reflective layer, several techniques can be used. In accordance with one embodiment, a mask may be provided on the layer of microspheres (or on a space coat or other layers that are desired as intermediate layers between the microspheres and the reflective layer) and the metal may then be vapour deposited through the mask. Vapour deposition through a mask is for example disclosed in EP 759179. In a particular embodiment, the mask may comprise of a regular two-dimensional pattern such as for example a plastic sheet punched with holes, e.g. holes of circular shape. Use of such a mask will result in metal areas on the microsphere layer corresponding to the shape and size of the holes. In another embodiment, a non-woven web may be used as a mask which can result in an irregular pattern of vapour deposited metal areas and corresponding areas that don't have metal deposited. Generally it will be preferred to temporarily adhere the mask to the microsphere layer or space coat or intermediate layers provided thereon. This will generally provide more sharp and defined edges of the metal and open areas. The mask may be adhered by a pressure sensitive adhesive that allows the mask to be cleanly removed after the metal vapour deposition step.

Alternatively, the metal may be vapour deposited over the whole surface of the microspheres and than selectively etched away as disclosed in for example U.S. Pat. Nos. 5,264,063, 4,801,193, and U.S. Pat. No. 5,503,906.

The semi-transparent retroreflective material comprises a two-dimensional regular or irregular pattern of transparent and opaque areas. Generally this is achieved by providing the layers constituting the semi-transparent retroreflective material as transparent (clear or translucent) layers. The pattern of the reflective layer then causes a two-dimensional pattern of transparent and opaque areas as a result of the metal areas of the reflective layer which are provided as opaque areas.

Although convenient, it is not required that the pattern of transparent and opaque areas corresponds one to one to the pattern of metal and open areas in the reflective layer. For example, a further patterned layer may be provided, for example behind the reflective layer, whereby said patterned layer renders the semi-transparent retroreflective material opaque at some of the open areas of the reflective material.

The total surface of transparent areas relative to the total amount of surface of the semi-transparent retroreflective material at its retroreflective side should be at least 5%, for example at least 10% and conveniently at least 15 or 20%. Depending on the regulatory requirements, the transparent areas may occupy up to 70% of the total amount of the surface of the semi-transparent retroreflective material. A typical range may be from 15 to 70%. In another embodiment, the range may be from 20 to 60% or from 25 to 55%.

According to a further embodiment to provide a transparent retroreflective sheet, a dielectric mirror is provided as the reflective layer functionally behind the transparent microsphere. A dielectric mirror is typically transparent.

The dielectric mirrors may be similar to known dielectric mirrors disclosed in U.S. Pat. Nos. 3,700,305 and 4,763,985. In using dielectric mirrors with microspheres, the microspheres typically have a refractive index n2 and have a layer of transparent material disposed thereon which has a refractive index n1. The opposite face of the transparent material having refractive index n1, is in contact with a material having a refractive index n3. Both n2 and n3 have a refractive index of at least 0.1, preferably at least 0.3, higher or lower than n1. The transparent material is a layer typically having an optical thickness corresponding to odd numbered multiples (that is, 1, 3, 5, 7 . . . ) of about one-quarter wavelength of light in the wavelength range of about 380 to about 1,000 nanometers. Thus, either n2>n1<n3 or n2<n1>n3, and the materials on either side of the transparent layer may be either both higher or both lower in refractive index than n1. When n1, is higher than both n2 and n3, n1 is preferably in the 1.7 to 4.9 range, and n2 and n3 are preferably in the 1.2 to 1.7 range. Conversely, when n1 is lower than both n2 and n3, n1 is preferably in the 1.2 to 1.7 range, and n2 and n3 are preferably in the 1.7 to 4.9 range. The dielectric mirror preferably comprises a contiguous array of materials, at least one being in layer form, having an alternating sequence of refractive indices. In a preferred embodiment the contiguous array has from two to seven layers, preferably three to five layers. Desirably all are light transparent materials and are clear or essentially colorless to minimize light absorption and maximize light transmission of the retroreflective sheet.

Among the many compounds that may be used in providing transparent materials within the desired refractive index range are: high index materials such as $CdS$, $CeO_2$, $CsI$, $GaAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, $TiO_2$; low index materials such as $Al_2O_3$, $AlF_3$, $CaF_2$, $CeF_3$, $LiF$, $MgF_2$, $NaCl$, $Na_3AlF_6$, $ThOF_2$, elastomeric copolymers of perfluoropropylene and vinylidene fluoride et cetera. Other materials are reported in Thin Film Phenomena, K. L. Chopra, page 750, McGraw-Hill Book Company, New York, (1969). Preferred succeeding layers contain cryolite ($Na_3AlF_6$) and zinc sulfide. Dielectric mirrors or similar multi-layer reflective coatings can also be used in combination with cube corner sheeting as disclosed in e.g. JP 06-347622, U.S. Pat. No. 6,172,810, U.S. Pat. No. 6,224,219, U.S. Pat. No. 6,243,201 and U.S. Pat. No. 6,350,034.

The use of a dielectric mirror may further be combined with the patterned reflective layer of the semi-transparent retroreflective material described above whereby the dielectric mirror provides reflection in the open areas of the semi-transparent retroreflective material.

Cube corner sheeting, sometimes referred to as prismatic, microprismatic, triple mirror or total internal reflection sheetings, typically include a multitude of cube corner elements to retroreflect incident light. Cube corner retroreflectors typically include a sheet having a generally planar front surface and an array of cube corner elements protruding from the back surface. Cube corner reflecting elements include generally trihedral structures that have three approximately mutually perpendicular lateral faces meeting in a single corner, i.e. a cube corner. In use, the retroreflector is typically arranged with the front surface disposed generally toward the anticipated location of intended observers and the light source. Light incident on the front surface enters the sheet and passes through the body of the sheet to be reflected by each of the three faces of the elements, so as to exit the front surface in a direction substantially toward the light source. In the case of total internal reflection, the air interface must remain free of dirt, water and adhesive and therefore is enclosed by a sealing film. Alternatively, reflective coatings may be applied on the lateral faces of the cube corners. Suitable reflective coatings that can be applied include transparent reflective metal layers or a dielectric mirror as described. When the cube corner elements are provided with a reflective coating they can also be used in a configuration where they are generally positioned to the anticipated location of an intended observer.

Polymers for cube corner sheeting include poly(carbonate), poly(methyl methacrylate), poly(ethylene terephthalate), aliphatic polyurethanes, as well as ethylene copolymers and ionomers thereof. Cube corner sheeting may be prepared by casting directly onto a film, such as described in U.S. Pat. No. 5,691,846 (Benson, Jr.). Polymers for radiation-cured cube corners include cross-linked acrylates such as multifunctional acrylates or epoxies and acrylated urethanes blended with mono- and multifunctional monomers. Further, cube corners may be cast on to plasticized polyvinyl chloride film for more flexible cast cube corner sheeting. These polymers are often employed for one or more reasons including thermal stability, environmental stability, clarity, excellent release from the tooling or mold, and capability of receiving a reflective coating.

In an embodiment of this invention the cube corner sheeting may have a further polymeric layer bonded to the side of the cube corner sheeting that has the cube corner elements so as to form a plurality of closed cells in which an air interface is provided to the cube corner elements. Illustrative examples of cube corner-based retroreflective sheeting are disclosed in U.S. Pat. Nos. 4,588,258 (Hoopman); 4,775,219 (Appledorn et al.); 4,895,428 (Nelson); 5,138,488 (Szczech); 5,387,458 (Pavelka); 5,450,235 (Smith); 5,605,761 (Burns); 5,614,286 (Bacon Jr.) and 5,691,846 (Benson, Jr.).

According to a particular embodiment, the transparent, including semi-transparent, retroreflective sheet is laminated or bonded to a transparent polymeric support. The transparent polymeric support sheet and the retroreflective sheet are typically bonded together with one or more adhesive layers. The term 'bonded together' includes not only a configuration where the support sheet and retroreflective sheet are directly bonded to each other by the adhesive layer but also includes the option where one or more intermediate layers are present. For example, the retroreflective sheet and/or the polymeric support sheet may be coated with one or more primer layers to assure firm adhesion of the adhesive layer to these respective sheets. Still further, the sheets may be bonded to each other with two or more adhesive layers that are provided on opposite major sides of a transparent carrier layer.

The one or more adhesive layers suitable for bonding the support sheet and retroreflective sheet together should be transparent. Preferably the adhesive layer(s) will be at least 80%, preferably at least 90% transmissive for visible light. The adhesive layers preferably show good weatherability properties, have good thermal stability and are moisture resistant. The adhesive layer should furthermore create a high bond strength to each of the sheets such that the license plate cannot be delaminated. A sufficient bond strength typically means that the peel force necessary to delaminate the sheets from each other is at least 2 N/cm, preferably at least 4 N/cm. The adhesive layer may comprise a pressure sensitive adhesive, a heat-activatable adhesive, i.e. an adhesive that requires heat activation to develop a bond or a cross-linkable adhesive. Examples of adhesives include pressure sensitive adhesives (PSA) based on acrylic polymers, based on silicones or based on polyolefins as disclosed in Handbook of Pressure Sensitive Adhesive Technology (third edition) D. Satas, Ed. Satas and Associates, Warwick R.I./USA, 1989 on pages 444-514, 550-556 and 423-442 respectively. Adhesives that may be used to bond to substrates having a low surface energy such as polyolefin or polycarbonate, include for example pressure sensitive adhesives based on an acrylic copolymer of one or more alkyl esters of acrylic or methacrylic acid and a vinyl ester as disclosed in for example EP 1 318 181 or a pressure sensitive adhesive as disclosed in EP 1 245 656 which discloses a pressure sensitive adhesive composition that contains (i) the reaction product obtainable from a precusor composition comprising one or more alkyl esters of acrylic or methacrylic acid, one or more copolymerizable monomers that have a Lewis base functionality and optionally one or more cross-linkers and (ii) one or more tackifying resins. Still further pressure sensitive adhesives that can be used to create a strong bond in particular to a polycarbonate substrate include those disclosed in U.S. Pat. No. 4,181,752, U.S. Pat. No. 4,418,120 and WO 95/13331. These references teach PSA that are based on acrylic polymers that are cross-linked without however loosing their pressure sensitive adhesive properties. Further adhesive layer compositions that may be used include those that are based on a curable composition that upon curing creates a strong adhesive bond between the sheets. Suitable curable compositions that may be used include radiation curable epoxy compositions. Such compositions may be applied in their uncured (or partially cured) state between the sheets. Upon curing of the laminate through radiation, e.g. LTV radiation or electron beam radiation, a firm and durable bond can be created. Examples of epoxy based curable compositions can be found in e.g. EP 1026218 and EP 620 259 disclosing a UV or electron beam curable epoxy composition comprising an epoxy resin, a polyester and optionally a photoinitiator. Still further epoxy-based adhesive compositions are disclosed in U.S. Pat. No. 4,622,349, U.S. Pat. No. 4,812, 488, U.S. Pat. No. 4,920,182, U.S. Pat. No. 4,256,828 and EP 276716. Further, according to a particular embodiment of the invention, an epoxy based pressure sensitive thermosetting adhesive can be used as disclosed in U.S. Pat. No. 5,086,088. This U.S. patent discloses a pressure-sensitive thermosetting adhesive comprising from about 30% to about 80% by weight of a photopolymerizable prepolymeric or monomeric syrup containing an acrylic ester and a polar copolymerizable monomer, from about 20% to about 60% by weight of an epoxy resin or a mixture of epoxy resins containing no photopolymerizable groups, from about 0.5% to about 10% by weight of a heat-activatable hardener for the epoxy resin, from about 0.01% to about 5% of a photoinitiator, and from 0% to about 5% of a photocrosslinking agent.

Suitable transparent polymeric support sheets for combining with the transparent retroreflective sheet will typically be stiff polymeric support sheets. That is, although the transparent polymeric support sheet may be bended somewhat, it has a sufficient stiffness such that it cannot be folded or wrinkled as may be possible with a film or foil. Thus, the support sheet will typically have a thickness to provide such desired stiffness. Typically, the transparent support sheet will have a thickness between 0.2 and 5 mm, preferably between 0.3 and 3 mm and most preferably between 0.5 mm and 1.5 mm. The transparent polymeric support sheet may be comprised of a single polymer layer or may be comprised of several polymer layers of same or different composition.

A layer of the polymeric support sheet may be a thermoplastic polymer layer or may be a cross-linked polymer layer. Also, a combination of thermoplastic polymer layers and cross-linked polymer layers may be used.

Polymeric materials that may be used in the transparent polymeric support sheet include thermoplastic polymers such as polycarbonates, poly(meth)acrylates such as polymethyl methacrylate, polyolefins such as polyethylene and polypropylene, polyesters such as polyethyleneterephthalates and polyethylenenaphthalates, cellulose acetate, polyvinyl chloride and copolymers of acrylonitrile, styrene and butadiene. The transparent polymeric support may further include one or more layers of cross-linked material.

In a preferred embodiment, the transparent polymeric support sheet is cold-formable. By 'cold-formable' in connection with the invention is meant that raised indicia can be formed in the transparent polymeric support sheet at ambient temperature (20 to 35° C.) for example through embossing or deep drawing and that such raised indicia are maintained at elevated temperatures to which the license plate may be exposed, e.g. when the motor vehicle is parked in the sun. This typically requires that the polymeric support has a sufficient heat stability, i.e. the polymeric support sheet should typically be heat stable upto temperatures of 60° C. to 85° C. Without sufficient heat stability, the number of the license plate may fade over time or become distorted. This will be particularly the case when the indicia are cold-formed through embossing because of stress forces created in the polymeric support sheet during the embossing. Examples of transparent polymeric support sheets that are cold-formable include polymeric support sheets comprising polycarbonate. Also, a polymeric support sheet that is cold-formable may be obtained from a multi-layer construction including one or more thermoplastic polymers enumerated above and one or more layers of a cross-linkable material. Upon cold-forming the indicia in the polymeric support sheet, the cross-linkable material may be cross-linked to a polymeric cross-linked material. Thus, the one or more layers of polymeric cross-linked material will provide the desired heat stability because the cross-linked material will prevent the thermoplastic layers of the multi-layer sheet from flowing, which would cause the cold-formed indicia to disappear. Still further, a cold-formable polymeric support sheet may comprise one or more layers that comprise a cross-linkable thermoplastic polymer composition. In the non cross-linked state, the polymeric support sheet can be readily cold-formed to provide indicia therein. Subsequent to forming the indicia, the cross-linkable thermoplastic polymer composition can be cross-linked such that the layer(s) looses its thermoplastic properties and sufficient heat stability may thereby be provided.

The cross-linkable material that can be used includes materials that may be heat cross-linked, cross-linked by light including visible light and UV light, cross-linked by electron beams or by gamma irradiation. The cross-linkable material may be a composition that is based on cross-linkable monomeric or low molecular weight components, cross-linkable polymer components as well as combinations thereof. Suitable cross-linkable materials that can be used include for example an electron beam curable vinyl chloride-acrylate copolymer as disclosed in U.S. Pat. No. 4,889,895, a radiation curable polyvinyl chloride as disclosed in U.S. Pat. No. 4,631, 229, an epoxy based curable composition as described above for use in the adhesive layer.

The transparent polymeric sheet may be on the front side of the license plate, i.e. on the side facing a viewer of the license plate when mounted on a for example a vehicle. Alternatively, the transparent polymeric sheet is laminated on the back side of the retroreflective sheet and the latter is then on the front side of the license plate.

Method of Making the License Plate

The license plate can be made by equipment and techniques that are typically used to produce conventional front lit license plates. Thus, according to one embodiment of the method, the license plate may be obtained by laminating a transparent polymeric support sheet and a retroreflective sheet together followed by dimensioning and shaping the obtained laminate as desired. Alternatively however, the respective sheets forming the laminate may be dimensioned and shaped before being adhered together. Generally, a rim is also provided along one or more sides of the license plate. This rim may be used to locate within a frame that may be used to mount the license plate over the light guide. The laminate may then be embossed to provide raised indicia. Such embossing is preferably carried out at ambient temperature by pressing a metallic or thermoset polymeric template having a representation of the indicia on the license plate. Following this operation, the raised surfaces of the indicia may be colored by hot stamping a colored wax ribbon thereon. Accordingly, this method allows for making back-lit license plate using the equipment that is typically used to make embossed metallic license plates. Alternatively, the raised indicia may be thermoformed by subjecting the laminate to heat while pressing a template representing the indicia on the laminate.

Back-lit license plates where the indicia are printed by e.g. a thermal transfer printer or inkjet printer can equally be produced with existing manufacturing equipment. For example, such printed license plates are used in the UK. Thus, to produce back-lit license plates that have printed indicia, a laminate of the polymeric support sheet and the retroreflective sheet may be printed on the front face with the indicia. Alternatively, the indicia may be first printed on the retroreflective sheet before it is laminated with the support sheet. Still further, the support sheet, if it defines the front face of the license plate, may be reverse printed before being laminated with the retroreflective sheet. Yet further, an additional transparent film may be included in the laminate which may be provided with the printed indicia. Thus, the same laminate can be used for a variety of existing license plate manufacturing methods.

License Plate Assembly

According to the present invention, the license plate is arranged in front of a light guide. The light source may comprise a light guide having a front face to which the license plate can be removably mounted, a back face opposite thereto and one or more side faces and (ii) a light source for illuminating the light guide arranged along at least portion of at least one of the side faces, the other side faces generally being closed so as to not to allow light to escape there through. The light source that is used in the edge lighting of the light guide is typically an elongate light source. An elongate light source emits light substantially along its longitudinal direction and comprises an elongated luminant, like a light tube, e.g. a fluorescent tube, or several individual luminants spaced from each other and arranged adjacent to each other along the longitudinal direction of the light source. Accordingly, an elongate light source can comprise a linear array of separate light emitting elements. According to a particular embodiment, a plurality of light emitting diodes (LEDs) are used for the elongate light source.

Within the light guide, light is transmitted by total internal reflection at the front and back and side faces until the light rays impinge onto the front face and onto the light-transmissive retro-reflective film at an angle at which the light is transmitted out of the front face of the light guide. The light guide may be a hollow or a solid light guide.

The amount of light extracted out of the front face of a light guide can be enhanced by light-scattering particles added to the transparent material of the light guide. Moreover, a back reflector can be arranged at the back face of the light guide. Reflectors can also be arranged at the side faces of the light guide. Both the back reflector and the side face reflectors preferably are diffuse reflective, specular reflective, or scattering reflective films with high reflection efficiency. Arranging reflectors and, in particular, highly diffuser or specular or scattering reflective films along the back and side faces of the light guide provides for a light guide in which light can escape exclusively through the front face so that most of the light of the light source can be used for illuminating the license plate. Accordingly, such a design is highly efficient with regard to the required brightness, even illumination, and power consumption.

Moreover, other light extraction mechanisms, films or paints (in addition to, or as an alternative to, the reflectors mentioned before) can be used with the light guide. Also light-extraction elements printed onto a surface of the light guide (e.g. dots of variable size, shape and density) can be employed. Such arrangements are described, for example, in U.S. Pat. Nos. 5,736,686; 5,649,754; 5,600,462; 5,377,084; 5,363,294; 5,289,351; 5,262,928; 5,667,289; and 3,241,256. Other light extraction arrangements that can be practiced are described in U.S. Pat. No. 5,618,096, WO-A-92/05535, and WO-A-01/71248.

In accordance with a particular embodiment, the cushioning layer of the license plate assembly is provided as a back reflector for the light guide. For example, a white or substantially white cushioning layer may be used for this purpose. A particular suitable cushioning layer that may function as a back reflector is a non-woven web material such as for example THINSULATE materials available from 3M Company.

In accordance with a particular embodiment of the invention a more homogenous and energy-efficient light distribution in the light guide can be realized by coupling the light of the individual light emitting elements (e.g. LEDs) to the light guide by means of optical lenses located at the side face of the light guide. The lens characteristic can be achieved by forming rounded notches in the side face of the light guide wherein each light emitting element has a separate notch associated thereto. These notches can receive the light emitting elements, i.e. the ends of optical fibers or the LEDs which can be either normal LEDs with rounded housings or surface mount device LEDs having a flat structure with a transparent covering material having also lens characteristics. Due to the lens characteristic at the side face of the light guide along which the light is coupled to the light guide, the light emitted from the light emitting elements and transmitted into the light guide will be spread within the light guide. Light reflected from the surface of the notches and the remaining areas of the side face of the light guide can be reflected back to the side face and notches by means of a side face reflector as mentioned before and arranged such that the light emitting elements are located between the light guide and the reflector.

In accordance with a particular embodiment, the housing comprises a back plate having upstanding side walls. The light guide and light source are disposed in this cavity. Between the light guide and the back plate of the housing is provided a cushioning layer, preferably a reflective cushioning layer such as a white non-woven web. The light guide may be further protected with a transparent film or sheet that is preferably sealed against the side walls of the cavity, for example by laser welding. In a preferred embodiment, the transparent film will have at least one rough surface and is arranged with that rough surface facing the light guide. This can minimize formation of so-called Newton rings. The license plate can be secured and mounted to the housing a frame. Generally, the housing and frame will be of plastic and are provided with closing means that can mutually engage with each other. According to a preferred embodiment, the frame and the housing are provided with reclosable fasteners such that the housing can be opened to replace the license plate if necessary. Alternatively, the frame may be screwed against the back plate. Also, in a particular embodiment, a rubber seal may be included, for example in the frame. Preferably, the back plate of the housing is continuous and closed to avoid dirt and humidity penetrating between the light guide and the license plate.

Figure 1:
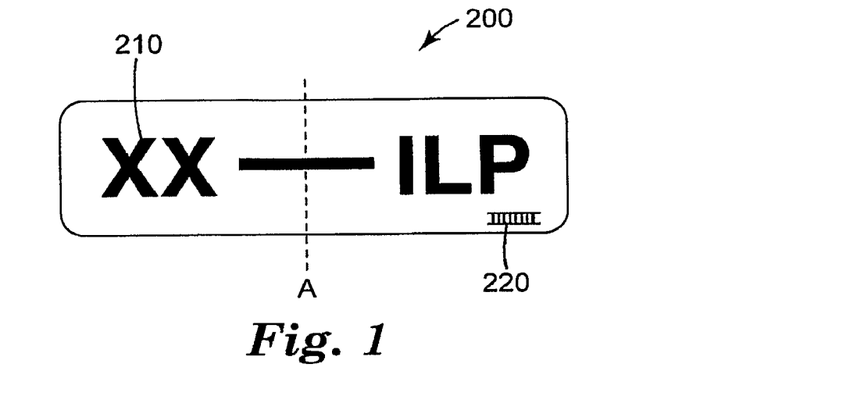
FIG. 1 is a planar view of a license plate.

The invention will now be described in more detail with reference to the following drawings which are schematic, purely illustrative and should not be taken to limit the invention in any way:

FIG. 1 shows a license plate 200 comprising indicia 210 that define the number of the license plate as issued by an authority. License plate 200 further shows barcode 220 which may present additional information regarding the license plate such as source of its manufacturing.

Figure 2:
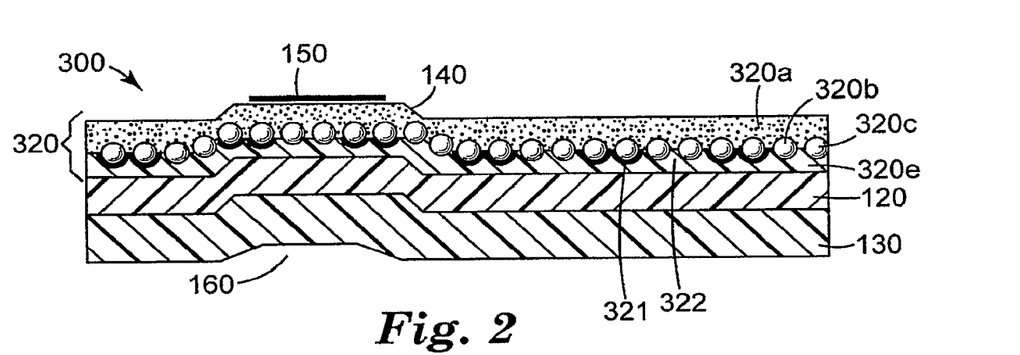
FIG. 2 is a cross-sectional view along line A in FIG. 1 and illustrating an embodiment of a license plate in connection with the invention.

FIG. 2 show a cross-section along line A in FIG. 1 illustrating a particular embodiment of the license plate in connection with this invention. License plate 300 illustrated in FIG. 2 uses semi-transparent retroreflective sheeting 320 adhered by transparent adhesive layer 120 to transparent polymeric support sheet 130. Retroreflective sheeting 320 comprises glass or ceramic microspheres 320b that are partially embedded in a binder matrix comprising a bottom layer 320e and a topcoat 320a. Functionally behind the microspheres 320b is a reflective layer 320c. Reflective layer 320c comprises a pattern of metal areas 321 and open areas 322. Between the microspheres and the reflective layer 320c there may be provided a space coat (not shown) as described above. Retroreflective sheet 320 is arranged such that the microspheres will be on the display side of the license plate. The indicia 140 of the license plate are raised and are rendered opaque by a hot stamp foil 150. On the rear side a recess 160 corresponding to the raised indicia is present as result of embossing the laminate to obtain the raised indicia.

Figure 3:
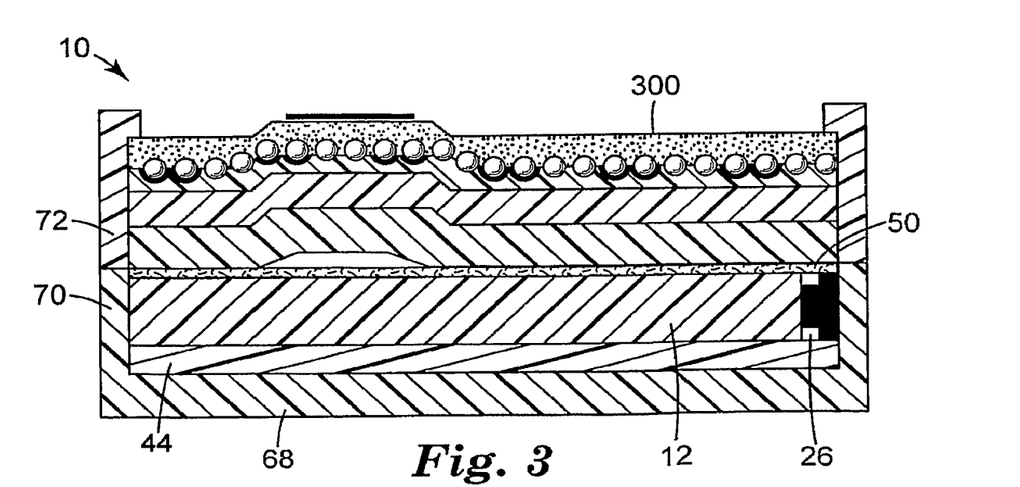
FIG. 3 shows a cross-sectional view of an embodiment of a license plate assembly according to the invention.

FIG. 3 illustrates an embodiment of a license plate assembly according to the invention. License plate assembly 10 comprises a light source that consists of a light guide 12 and an elongated light source 26 lighting the light guide from one of its side faces. On the front face of the light guide is arranged license plate 300. Between the light guide 12 and the back plate 68 there is provided a cushioning layer 44 that is diffuse reflective, e.g. a white non-woven web. License plate 300 is mounted on the light guide 12 by frame 72 which is secured to the upstanding side walls 70 of back plate 68. Upstanding side walls 70 define a cavity in which the light guide 12 and elongate light source 26 are disposed. The light guide 12 is protected with a transparent film 50 having a rough surface facing light guide 12. Transparent film 50 is typically laser welded to the upstanding walls 70.

Figure 4:
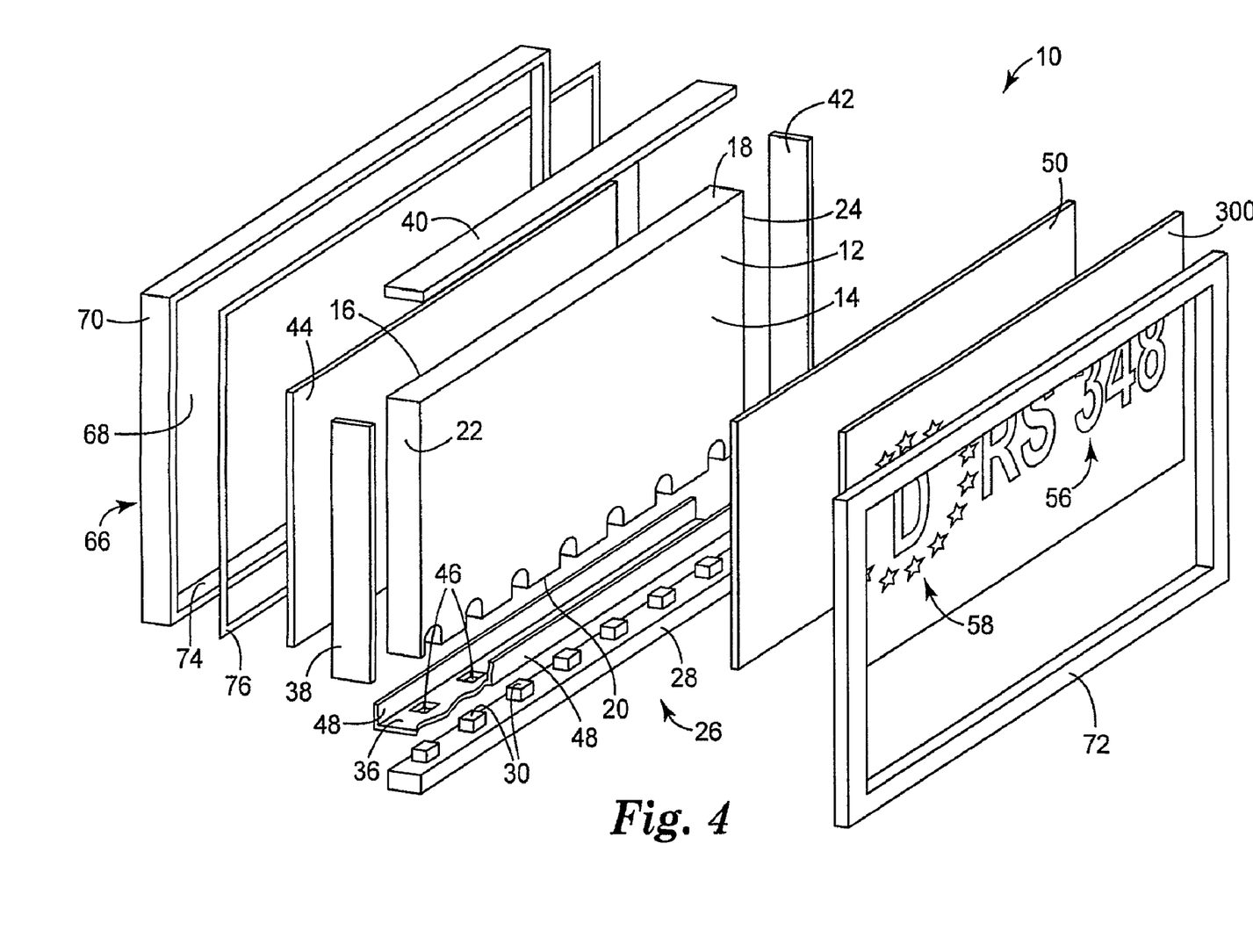
FIG. 4 is an isometric and exploded view of the license plate shown in the cross sectional view in FIG. 3.
Figure 5:
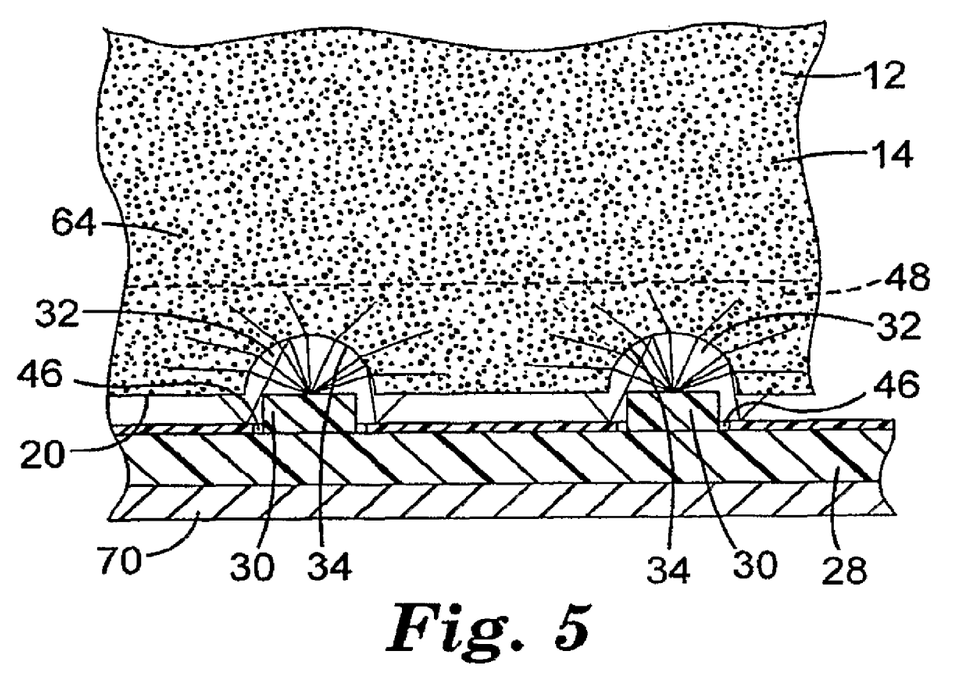
FIG. 5 is a partial cross-sectional view of an embodiment of a license plate assembly according to the invention.

An embodiment of a license plate assembly is further illustrated in FIG. 4. According to this FIG. 4, the license plate assembly 10 comprises a solid light guide 12 made of a transparent synthetic material (for example, acrylic, e.g. polymethylmethacrylate, or polycarbonate) and having a plate-like shape. Moreover, the light guide 12 can be provided with light scattering particles 64 substantially homogenously distributed within the material of the light guide 12 and having different light diffractive properties (FIG. 5). The light guide 12 comprises a major front face 14 and an opposite major back face 16 as well as opposite side faces 18,20 and 22,24. Along one of the side faces (in this embodiment along the lower side face 20) of the light guide 12, an elongate light source 26 is arranged comprising a printed circuit board 28 or the like carrier strip carrying several LEDs 30 (generally 4 to 12, for example 6 to 8) arranged side by side for forming a linear array. The elongate light source 26 provides for edge illumination of the light guide 12.

As can be seen in FIGS. 4 and 5, associated to each LED 30 there is formed a notch 32 in the lower side face 20 of the light guide 12. Within the notches 32, the lower side face 20 of the light guide 12 is provided with concave curvatures 34 acting as diverging lenses integral with the light guide 12 for spreading the light rays emitted by the LED towards and transmitted into the light guide 12. This can be seen in particular in FIG. 5.

Highly specular or diffuse reflectors 36, 38, 40, and 42 are arranged along the side faces 18,20,22,24 of the light guide 12. These reflectors are adhered to the light guide 12 by means of an optically clear (transparent) adhesive preferably having a refractive index no greater than 1.3. Other optical clear adhesives can also be used. Suitable adhesives are available from 3M Company, St. Paul, USA (e.g. #8141, #8142, #8161, or #9483). Moreover, a cushioning layer 44 that is diffuse reflective, e.g. a white non-woven web is arranged to face the back face 16 of the light guide 12. The back reflectors 36,38, 40,42 may be comprised of a film. For example such a film is available from 3M Company, St. Paul, USA, and is named Visible Mirror Film VM 2002 or VM 2000 F1A6 or Light Enhancement Film 3635-100.

As can be seen in particular from FIG. 4, the strip-like reflector 36 has its lower side face 20 provided with holes 46 through which the LEDs 30 extend. Moreover, the reflector 36 at its lateral edges 48 extends along the bottom edges of the front and back faces 14,16 of the light guide 12. Within these lateral edges 48 the reflector 36 reflects light emitted from the LEDs 30 back into the light guide 12.

Accordingly, light of the LEDs 30 transmitted into the light guide 12 exit mostly through the front face 14 of the light guide for creating an illuminated side of the light guide 12.

Arranged in front of the front face 14 of the light guide 12 is a transparent and retroreflective license plate 300, an embodiment of which has been described in detail above with references to FIGS. 1 and 2.

EXAMPLES

Example 1

Preparation of a Thin Lamp

A one-part lamp housing having a generally thin and flat shape was prepared by injection molding of a polycarbonate blend. The lamp housing comprised a flat back plate portion (ca. 520 mm by ca. 110 mm) and a rim portion having a height of ca. 6 mm. The back plate portion of the lamp housing comprised an array of needle-like projections having a height of ca. 2 mm, projecting from the surface of the back plate bearing the rim. A white non-woven web comprising 20% polyester staple fibers and 80% polypropylene fibers and having a thickness of 8 mm (available commercially from 3M Company, St. Paul, Minn./USA as product number TAI 2099 THINSULATE™ Acoustic Insulator Material) was placed on top of the back plate of the housing and inside the rim of the housing. The needle-like projections on the back plate penetrated the non-woven web and prevented it from slipping in relationship to the back plate. The non-woven web had a density of 25 kg/m$^3$ and a surface weight of 220 g/m$^2$ (according to 3M procedure OTM 1151). The non-woven web served as both a light reflector and light diffuser for the interior rear surface of the lamp and also provided a compressible cushion for maintaining tension on the elements within the assembly.

A flat sheet-shaped light guide bearing LEDs on one edge was prepared by the following procedure. A flat polymethylmethacrylate (PMMA) sheet having a thickness of ca. 3 mm, available commercially from Degussa Roehm (Darmstadt, Germany) as product number Type GS 1002, was cut to a shape having approximately the same width and length as the back plate of the lamp housing. A printed circuit board having a length of ca. 100 mm and width of ca. 3 mm was fitted with 6 LEDs and resistors. The circuit board was adhered to one of the thin longer edges of the light guide in a manner such that the LEDs illuminated the light guide uniformly. The other three thin edges of the light guide were covered with a silver polyester-based pressure-sensitive adhesive tape, available as Polyester Tape Silver #850 from 3M Company, St. Paul/USA. Adhesive tape was also placed over the printed circuit board, sealing it firmly to the light guide and providing additional light reflective surface.

A protective plate for the front of the lamp was then prepared. A sheet of translucent 2 mm thick polycarbonate having one smooth surface and one rough surface was laid over the light guide so that the rough surface was in contact with the light guide. The roughened surface of the protective plate prevented formation of Newtonian rings. The protective plate was then welded to the lamp housing with laser welding. The cable extending from one end of the printed circuit board passed through a cut-out in the lamp housing. The cable exit hole in the housing was sealed with a 2-component curable sealant to prevent water or dirt ingress into the lamp.

Preparation of a Translucent Retroreflective License Plate

A retroreflective transparent sheet bearing a pressure-sensitive adhesive on its rear face was adhered to a 1 mm thick and transparent polycarbonate sheet. The license plate had the finished dimensions according to German law requirements. The license plate was then cold embossed with alpha-numeric indicia. The alpha-numeric indicia were then blackened on their entire elevated surface using a hot-stamping film.

License Plate Frame

A front frame for holding the license plate onto the lamp was prepared by injection molding of a black mixture of ABS and polycarbonate. The frame was constructed so as to fit over the license plate and mate with the rim of the lamp housing.

Mounting the License Plate on the Lamp

The license plate was placed in contact with the surface of thin lamp prepared as described above. The frame was positioned over the lamp bearing the license plate and mated with the rim of the lamp housing. The license plate was thus firmly attached to the lamp and light could pass from the LEDs, through the light guide and out the front of the assembly through the transparent retroreflective license plate.

The assembly was constructed so that the frame could be removed lamp housing without damaging either part. Thus the license plate could be removed and replaced without damaging the lamp or the detachable frame.

Test Results

The license plate was subjected to vibration testing by mounting it on a table of a Highly Accelerated Life Testing Chamber (Enviratronics Model Nr: Star 44)" and subjected to random vibration (up to 20 G) for 4 hours at −40° C. The assembly was immediately moved to an environment of 80° C. and shaken under the same conditions for an additional 4 hours. After the test, the assembly showed no damage on visible inspection. The light output of the device was measured before and after the vibration test. No decrease on light output was measured. No rattles could be detected before or after the vibration test.

The invention claimed is:

1. A license plate assembly comprising:
   a housing comprising a back plate and upstanding side walls defining a cavity;
   a light guide having first and second major sides that are opposite to each other and one or more side faces defining a thickness of side light guide, said light guide being disposed in said housing and;
   a light source mounted along one or more side faces of said light guide;
   a transparent and retroreflective license plate mounted on said first major side of said light guide; and
   a cushioning layer between said back plate of said housing and said light guide.

2. The license plate assembly of claim 1, wherein said cushioning layer is adapted to be reflective on its major side facing the light guide.

3. The license plate assembly of claim 2, wherein said cushioning layer is white or substantially white on its major side facing the light guide.

4. The license plate assembly of claim 1, wherein said cushioning layer is selected from the group consisting of woven webs, non-woven webs, rubbers and foams.

5. The license plate assembly of claim 4, wherein said cushioning layer covers all or a major part of the second major face of said light guide.

6. The license plate assembly of claim 1, wherein said light source comprises one or more LEDs.

7. The license plate assembly of claim 1, wherein said license plate comprises a laminate of a plastic support and a transparent retroreflective sheet.

8. The license plate assembly of claim 7, wherein said transparent retroreflective sheet comprises a layer of transparent microspheres having a reflective layer arranged functionally behind said layer of transparent microspheres.

9. The license plate assembly of claim 7, wherein said transparent retroreflective sheet comprises cube corner or prismatic elements.

10. The license plate assembly of claim 7, wherein said transparent retroreflective sheet comprises a semi-transparent retroreflective material having a retroreflective side and an opposite rear side, the retroreflective material having a regular or irregular two dimensional pattern of transparent and opaque areas, said retroreflective material comprising a layer of transparent microspheres and a reflective layer located functionally behind said layer of transparent microspheres, said reflective layer comprising a regular or irregular two dimensional pattern of metal areas of contiguous metal and open areas having substantially no metal, wherein open areas of said reflective layer correspond to transparent areas of said retroreflective material and metal areas of said reflective layer correspond to opaque areas of said retroreflective material and wherein said transparent microspheres are present in said transparent and opaque areas and wherein said transparent areas comprise at least 5% of the total surface of said retroreflective material on said retroreflective side.

11. The license plate assembly of claim 1, wherein said license plate comprises raised structures defining indicia.

12. The license plate assembly of claim 1, wherein said license plate is mounted on said first major side of said light guide by a frame enclosing the license plate and attached to said housing.

* * * * *

UNITED STATES PATENT AND TRADEMARK OFFICE
CERTIFICATE OF CORRECTION

| | | |
|---|---|---|
| PATENT NO. | : 8,016,467 B2 | Page 1 of 1 |
| APPLICATION NO. | : 12/278082 | |
| DATED | : September 13, 2011 | |
| INVENTOR(S) | : Arnold Eberwein | |

It is certified that error appears in the above-identified patent and that said Letters Patent is hereby corrected as shown below:

Column 8
Line 22, delete "R.I./USA," and insert -- RI/USA, --, therefor.

Column 8
Line 48, delete "LTV" and insert -- UV --, therefor.

Column 12
Line 20, after "housing" insert -- using --.

Column 14
Line 23, delete "(PMMA)" and insert -- (pMMA) --, therefor.

Signed and Sealed this
Sixth Day of December, 2011

David J. Kappos
*Director of the United States Patent and Trademark Office*